(12) United States Patent
Panwar et al.

(10) Patent No.: US 11,885,428 B2
(45) Date of Patent: Jan. 30, 2024

(54) VALVES AND METHODS OF OPERATING VALVES

(71) Applicant: Toyota Motor Engineering & Manufacturing North America, Inc., Plano, TX (US)

(72) Inventors: Shardul S. Panwar, Ann Arbor, MI (US); Deborah Bumgardner, Garden City, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 63 days.

(21) Appl. No.: 17/326,885

(22) Filed: May 21, 2021

(65) Prior Publication Data
US 2022/0373095 A1    Nov. 24, 2022

(51) Int. Cl.
*F16K 31/02* (2006.01)
*A41D 27/28* (2006.01)

(52) U.S. Cl.
CPC .......... *F16K 31/025* (2013.01); *A41D 27/285* (2013.01)

(58) Field of Classification Search
CPC ..... F18K 31/025; A62B 17/005; A41D 1/005; A41D 31/145; A41D 31/14
USPC .............................................. 251/11, 129.06
See application file for complete search history.

(56) References Cited

U.S. PATENT DOCUMENTS

| | | | | |
|---|---|---|---|---|
| 3,706,102 A | * | 12/1972 | Grenier | A41D 31/14 2/84 |
| 5,088,115 A | * | 2/1992 | Napolitano | A62B 17/006 2/84 |
| 5,255,390 A | * | 10/1993 | Gross | A41D 13/0025 607/104 |
| 5,619,177 A | * | 4/1997 | Johnson | H01H 61/0107 60/527 |
| 5,678,247 A | * | 10/1997 | Vickers | A41D 13/00 2/243.1 |
| 10,066,829 B2 | * | 9/2018 | Wong | H05K 1/038 |
| 10,191,550 B1 | | 1/2019 | Nussbaum et al. | |
| 10,591,078 B2 | * | 3/2020 | Oehler | F16K 49/002 |

(Continued)

FOREIGN PATENT DOCUMENTS

CN        105946515 B      4/2018

OTHER PUBLICATIONS

T. Buckner et al., "Roboticizing Fabric by Integrating Functional Fibers", Aug. 12, 2020, 10 pages, https://sci-hub.se/https://www.pnas.org/content/117/41/25360.

(Continued)

*Primary Examiner* — Umashankar Venkatesan
(74) *Attorney, Agent, or Firm* — Dinsmore & Shohl LLP

(57) ABSTRACT

A valve includes a substrate, a shape-memory wire, a conductive polymer, and a current source. The substrate defines an opening therethrough and includes at least one flap selectively extendable across the opening. The shape-memory wire is coupled to the at least one flap. The conductive polymer is coupled to the at least one flap. The current source is coupled to the shape-memory wire and the conductive polymer, such that electrical current from the current source selectively energizes the shape-memory wire and the conductive polymer thereby moving the at least one flap between a closed position and an open position.

19 Claims, 7 Drawing Sheets

(56) References Cited

U.S. PATENT DOCUMENTS

| | | | |
|---|---|---|---|
| 10,773,487 B2 | 9/2020 | Frigerio et al. | |
| 10,814,514 B2 * | 10/2020 | Aihara | A41D 27/285 |
| 2007/0271939 A1 * | 11/2007 | Ichigaya | A41D 13/0025 |
| | | | 62/259.3 |
| 2010/0287965 A1 * | 11/2010 | Bryant | F25D 7/00 |
| | | | 62/259.3 |
| 2010/0294476 A1 * | 11/2010 | Gorni | G05D 23/08 |
| | | | 62/51.1 |
| 2016/0278459 A1 * | 9/2016 | Hilty | A41D 27/285 |
| 2016/0345088 A1 | 11/2016 | Vilermo et al. | |
| 2018/0249772 A1 | 9/2018 | Koo et al. | |
| 2019/0061307 A1 * | 2/2019 | Chen | A41D 27/285 |

OTHER PUBLICATIONS

Loz Blain, "Refrigerants Not Required: Flexible Metal Cooling Prototype Demonstrates Extreme Efficiency", Mar. 13, 2019, 5 pages, https://newatlas.com/shape-memory-alloy-nitinol-heatingcooling/ 58837/.

* cited by examiner

VALVES AND METHODS OF OPERATING VALVES

TECHNICAL FIELD

The present specification generally relates to valves for regulating fluid flow and, more specifically, to fabric valves including conductive polymers and/or shape-memory wires for selectively opening and closing the valve and methods of operating the same.

BACKGROUND

Conventional valves may be have used in a variety of industries for regulating fluid (e.g., gas or liquid) flow therethrough. However, valves are often formed of metal or other materials, which may be bulky, heavy, and/or rigid such that they are unable to conform to surrounding structure. As such, system designs are often conformed to a valve, which may limit design choices. Valves that are lighter, more compact, conformal, and/or softer could provide improved design solutions.

SUMMARY

In one embodiment, a valve includes a substrate, a shape-memory wire, a conductive polymer, and a current source. The substrate defines an opening therethrough and includes at least one flap selectively extendable across the opening. The shape-memory wire is coupled to the at least one flap. The conductive polymer is coupled to the at least one flap. The current source is coupled to the shape-memory wire and the conductive polymer, such that electrical current from the current source selectively energizes the shape-memory wire and the conductive polymer thereby moving the at least one flap between a closed position and an open position.

In another embodiment, a valve includes substrate, a shape-memory wire, and a conductive polymer. The substrate defines an opening therethrough and includes at least one flap selectively extendable across the opening. The shape-memory wire is coupled to the at least one flap. The conductive polymer is coupled to the at least one flap. The at least one flap moves between a closed position and an open position in response to a stimulus applied to the shape-memory wire, the conductive polymer, or both.

In yet another embodiment, a method for operating a valve including a substrate, a conductive polymer, and a shape-memory wire includes transitioning the conductive polymer from a rigid state to a flexible state, wherein the substrate defines an opening therethrough and includes at least one flap selectively extendable across the opening, and the conductive polymer and the shape-memory wire are coupled to at least one flap, and actuating the shape-memory wire between a first shape and a second shape, thereby transitioning the valve between an open position and a closed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
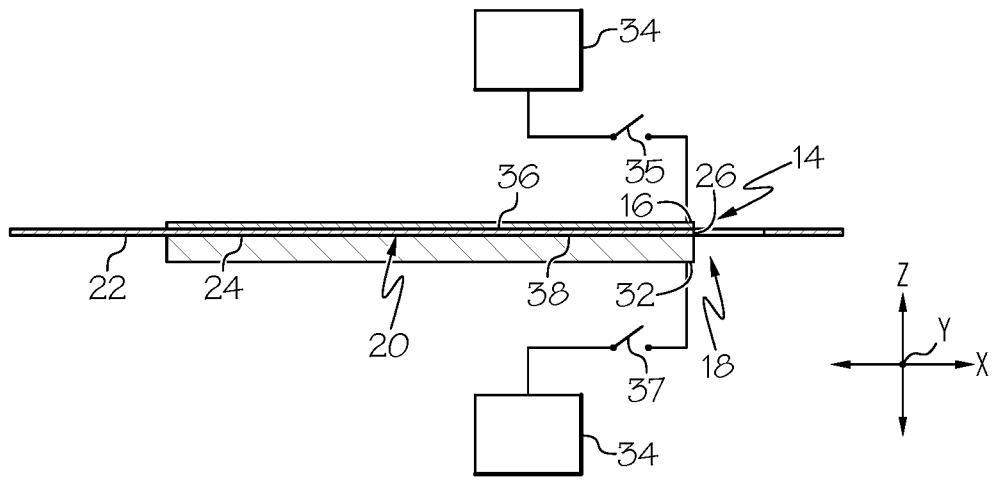
FIG. 1A schematically depicts a valve having at least one flap in a closed position, according to one or more embodiments shown and described herein.
Figure 1B:
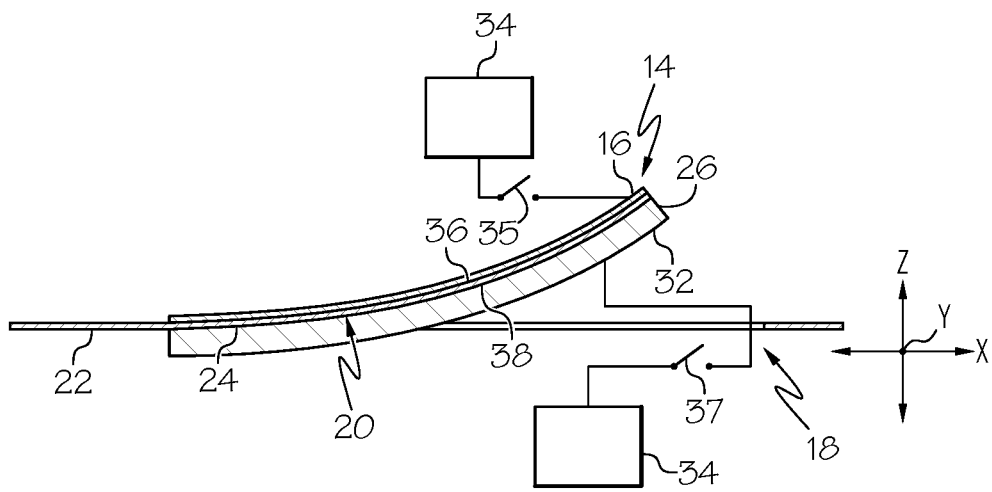
FIG. 1B schematically depicts the valve of FIG. 1A where the at least one flap is moved to an open position, according to one or more embodiments shown and described herein.

FIGS. 1A and 1B generally depict an embodiment of a valve for regulating fluid (e.g., air or other gasses and/or liquid) flow across the valve. For example, valves according to the present disclosure may be included in a variety of systems and apparatuses, including, for example, HVAC (heating, ventilation, and air conditioning) systems (e.g., such as within vehicles, houses, businesses, or the like) and/or on clothing to regulate air flow across a body of a user.

A valve according to the present disclosure may generally include a substrate, a shape-memory wire, and a conductive polymer. In some embodiments, the valve may further include a current source coupled to at least one of the shape-memory wire and/or the conductive polymer. The substrate may generally define an opening therethrough and include at least one flap selectively extendible across the opening. The shape-memory wire and the conductive polymer may each be coupled to the at least one flap. In response to temperature changes, current from the current source, or other stimuli, the conductive polymer and/or the shape-memory wire may change shape to retract or extend the at least one flap across the opening. That is, the conductive polymer and the shape-memory wire may be actuated to move the at least one flap between an open position, a closed position, and/or any position therebetween to regulate the flow of fluid through the opening. The substrate may be a conformable material such as fabric, though other materials are contemplated and possible which may be lightweight and/or conformable to a mounting location, which may provide increased flexibility for using the valve in a variety of applications. Additionally, a softer valve may prove more ergonomic and comfortable for users. Valves of the present disclosure may also have reduced weight and be more compact than conventional valves, leading to improved design solutions. These and additional features and benefits will be described in greater detail herein.

Referring now to FIGS. 1A and 1B, a schematic diagram of the valve 10 is depicted. In particular, the valve 10 may include a substrate 14, a shape-memory wire 16, a conductive polymer 32, and/or a current source 34. In yet further embodiments, the valve 10 may include an electronic controller 40 depicted in FIG. 5. It is noted that the valve 10 may include a greater or fewer number of components without departing from the scope of the present disclosure. It is noted that the components depicted in the figures are not necessarily to scale and have been exaggerated for illustration purposes.

The substrate 14 may be formed of any material, such as a flexible material. For example, the substrate 14 may be formed from fabric (e.g., cotton, nylon, leather, linen, polyester, wool, or any natural or synthetic fabric). The substrate 14 may define an opening 18 extending therethrough and may include at least one flap 20 selectively extendable across the opening 18. In particular, the opening 18 defines a fluid flow path or orifice for fluid (e.g., air or any other gas or liquid) to flow therethrough. The at least one flap 20 may selectively extend across the opening 18 to increase and/or decrease the size of the opening 18 to regulate the volume of fluid flow along the fluid flow path through the opening 18. For example, a decrease in the size of the opening 18 may reduce a volume of fluid flow through the opening while an increase in the size of the opening may increase the volume of fluid flow through the opening 18. The substrate 14 may be coupled to a conduit, such as part of an HVAC system, such that the opening 18 is aligned within the flow path of the conduit. In other embodiments, and as will be described in greater detail below, the substrate 14 may be integrated into clothing or other fabric structures (e.g., tents, blankets, etc.).

The at least one flap 20 may be selectively extendable across the opening 18 between an open position and a closed position. The at least one flap 20 may be complementary to the opening 18 such than when in the closed position, the at least one flap 20 alone or in conjunction with other flaps substantially closes off a cross-section or reduces a size of the opening 18 to provide reduced flow volume therethrough. In embodiments, the at least one flap 20 alone or in conjunction with other flaps may completely occlude the opening 18 when in the closed position. In the open position, the at least one flap 20 may be retracted to increase a size of the opening 18 to provide increased flow volume therethrough.

The substrate 14 may further define a periphery portion 22 surrounding the opening 18 (further depicted in FIGS. 2A and 2B) from which each of the at least one flap 20 extend. Each of the at least one flap 20 may define a first surface 36, and a second surface 38 opposite the first surface 36. The at least one flap 20 may define a peripheral end 24 coupled to and extending from the periphery portion 22 and a distal end 26 opposite the peripheral end 24. The one or more flaps 20 may be coupled to the periphery portion 22 at the peripheral end 24 or may be formed integrally with the periphery portion 22 as a monolithic structure.

A shape-memory wire 16 may be coupled to the at least one flap 20. For example, a shape-memory wire 16 may be coupled to each flap 20. The shape-memory wire 16 may be coupled to the at least one flap 20 in any conventional manner, such as by sewing, adhesive, fasteners, or the like. As will be described in more detail below, the shape-memory wire 16 may transition from a first shape to a second shape in response to a stimulus, including but not limited to, electricity, temperature, light, the presence of a liquid, movement, or the like.

For example, the shape-memory wire 16 may be formed of a shape-memory alloy. A shape-memory alloy may be an alloy having a transition temperature, where the alloy changes from a first shape to a second shape when the alloy meets or exceeds the transition temperature. The transition temperature may be a range of temperatures, where the change of shape of the shape-memory wire 16 varies over the range of temperatures of the transition temperature, gradually opening the valve 10 from the closed position to the open position or closing the valve 10 from the open position to the closed position. The range of transition temperatures may include a first transition temperature and a second transition temperature. The first transition temperature may be indicative of the lowest temperature in the transition temperature range. The second transition temperature may be indicative of the highest temperature in the transition temperature range. The transition temperature may be in the range of about −100° C. to about 200° C., such as about 0° C. to about 100° C., about 10° C. to about 80° C., about 25° C. to about 40° C., or the like. In some embodiments, the shape-memory wire 16 may include any material such as, but not limited to, zinc, copper, gold, iron, and, may be, for example, copper-aluminum-nickel, nickel-titanium, or the like.

The shape-memory wire 16 may extend along a length of the at least one flap 20 or only a portion thereof. In response to deformation of the shape-memory wire 16, the at least one flap 20 may be adjusted to a position between the open position and the closed position. For example, the shape-memory wire 16 may transition between a first shape (FIG. 1A) and a second shape (FIG. 1B). In embodiments, in the first shape, the shape-memory wire 16 may extend the flap 20 across the opening 18 to the closed position. In the second shape, the shape-memory wire 16 may be bent, or curved, to pull the flap 20 to the open position or to some position between the open position and the closed position.

The conductive polymer 32 may be coupled to the at least one flap 20. For example, the conductive polymer 32 may be coated or otherwise applied to the at least one flap 20 such as via an adhesive layer. The conductive polymer 32 may transition between a rigid state and a flexible state. In the rigid state, the conductive polymer 32 has a higher rigidity than in the flexible state to substantially maintain a position of the at least one flap 20 in the open position or closed position. Specifically, in the rigid state, the conductive polymer 32 may resist the bending or movement of the shape-memory wire 16, thereby maintaining a position of the at least one flap 20. In the flexible state, the conductive polymer 32 is substantially flexible, or malleable, such that the conductive polymer 32 may permit the bending of the shape-memory wire 16 to deform the at least one flap 20 between the open position and the closed position. The conductive polymer 32 may include any material capable of transitioning between a rigid state and a flexible state such as an epoxy, thermoplastic, rubber elastomer, or the like.

The conductive polymer 32 may include a glass transition temperature that, when met, transitions the conductive polymer 32 between the flexible state and the rigid state when the glass transition temperature is met or exceeded. The glass transition temperature may be a range of temperatures, where the rigidity of the conductive polymer 32 varies over the range of temperatures of the glass transition temperature. The range of glass transition temperatures may include a first glass transition temperature and a second glass transition temperature. The first glass transition temperature may be indicative of the lowest temperature in the glass transition temperature range. The second glass transition temperature may be indicative of the highest temperature in the glass transition temperature range. The glass transition temperature may be, for example in a range of −100° C. to about 200° C., such as about 0° C. to about 100° C., about 10° C. to about 80° C., about 25° C. to about 40° C., or the like.

The shape-memory wire 16 may be coupled to the first surface 36 of the at least one flap 20, and the conductive polymer 32 may be coupled to the second surface 38 of the at least one flap 20 such that the at least one flap 20 is interposed between the shape-memory wire 16 and the conductive polymer 32. In embodiments, the conductive polymer 32 may be coupled to the same surface of the at least one flap 20 as the shape-memory wire 16. In embodiments, the valve 10 may not include a conductive polymer 32.

In embodiments, the conductive polymer 32 and/or shape-memory wire 16 may move the at least one flap 20 from the open position to the closed position in response to an environmental temperature (e.g., ambient temperature, body temperature, etc.) at or exceeding the transition temperature of the shape-memory wire 16 and the glass transition temperature of the conductive polymer 32. Specifically, when an environmental temperature meets or exceeds the transition/glass transition temperature, the valve 10 may transition from the closed position (FIG. 1A) to the open position (FIG. 1B), allowing for increased fluid flow (such as airflow) through the valve 10. More specifically, when the environmental temperature meets or exceeds the glass transition temperature of the conductive polymer 32, the temperature of the conductive polymer 32 may meet or exceed the glass transition temperature, transitioning the conductive polymer 32 from the rigid state to the flexible state. Similarly, when the temperature of the shape-memory wire 16 meets or exceeds the transition temperature, the shape-memory wire 16 transitions from the first shape to the second shape. With the conductive polymer 32 in the flexible state, the shape-memory wire 16 can transition from the first shape to the second shape to pull the at least one flap 20 from the open position to the closed position. The valve 10 may return to the closed position when the ambient temperature drops below the transition/glass transition temperatures. For example, the transition temperature of the shape-memory wire 16 may be greater than the glass transition temperature of the conductive polymer 32. Accordingly, while the conductive polymer 32 remains in the flexible state as temperature drops, the shape-memory wire 16 may move back to the first shape, thereby pulling the at least on flap 20 to the closed position. As the temperature continues to drop, the conductive polymer 32 may transition back to the rigid state, thereby maintaining the at least one flap 20 in the closed position. Accordingly, the at least one flap 20 may respond dynamically to changes in environmental temperature.

In some embodiments, instead of or in addition to responding to environmental temperature changes, the shape-memory wire 16 and/or the conductive polymer 32 may be configured to change shape or state in response to electrical current. For example, a current source 34 may be in electrical communication with the conductive polymer 32 and/or the shape-memory wire 16. However, in embodiments, there may not be a current source 34 and the shape-memory wire 16 and/or the conductive polymer 32 may be configured to transition in response to other stimuli (e.g., temperature, liquid, light, movement, etc.). In other embodiments, different stimuli may actuate the conductive polymer 32 and the shape-memory wire 16 from one another. For example, the conductive polymer 32 may respond to changes in environmental temperature, which the shape-memory wire 16 responds to electrical stimulation, though any combination of stimuli are contemplated and possible.

In the present embodiment including a current source 34, electrical current from the current source 34 may be used to selectively transition the conductive polymer 32 between the rigid state and the flexible state and the shape-memory wire 16 between the first position and the second position. It is noted that a single current may be used to selectively transition each of the conductive polymer 32 and the shape-memory wire 16. In some embodiments, separate current sources may be used. The current source 34 may be any device configured to provide electrical current to the conductive polymer 32 and/or the shape-memory wire 16. For example the current source 34 may be a battery, an electrical outlet, or the like.

The current source 34 may selectively energize the conductive polymer 32 and/or the shape-memory wire 16 independently of one another. The electrical current to the conductive polymer 32 and/or the shape-memory wire 16 increases the temperature of the conductive polymer 32 and/or the shape-memory wire 16 thereby transitioning the conductive polymer 32 and/or the shape-memory wire 16 as described above. The current source 34 may vary the current supplied to the conductive polymer 32 and/or the shape-memory wire 16 to move the at least one flap 20 between the closed position, a partially open position, and a fully open position. That is, variable current may selectively control the temperature of the shape-memory wire 16 and/or the conductive polymer 32 over the transition temperature range(s) or otherwise allowing for the controlled amount of the opening 18 of the at least one flap 20 to regulate the amount of fluid flowing through the opening 18.

To control the flow of current between the current source 34 and the conductive polymer 32 and the shape-memory wire 16, the valve 10 may further include a first switch 35 and a second switch 37. The first switch 35 may be in electrical communication with and positioned between the current source 34 and the shape-memory wire 16. The first switch 35 may transition between a connected position and a disconnected position to electrically couple and decouple, respectively, the shape-memory wire 16 from the current source 34. In particular, in the connected position, current from the current source 34 may flow to the shape-memory wire 16. While in the disconnected position, current from the current source 34 is unable to reach the shape-memory wire 16.

The second switch 37 may be in electrical communication with and positioned between the current source 34 and the conductive polymer 32. The second switch 37 may transition between a connected position and a disconnected position to electrically couple and decouple, respectively, the conductive polymer 32 from the current source 34. In particular, in the connected position, current from the current source 34 may flow to the conductive polymer 32. While in the disconnected position, current from the current source 34 is unable to reach the conductive polymer 32.

In an example, a current may be applied to increase the temperature of the shape-memory wire 16 and/or the conductive polymer 32 to the transition temperature/glass transition temperature to move the at least one flap 20 to the open position or to the partially open position. Referring to FIG. 1A, the valve 10 is schematically depicted in the closed position. In the closed position, the shape-memory wire 16 may be in the first shape, extending such that the at least one flap 20 extends across the opening 18. Referring to FIG. 1B, the valve 10 is depicted in the open position. In the open position, the shape-memory wire 16 may be in the second shape. In the second shape, the shape-memory wire 16 may bend or pull the at least one flap 20 from the opening 18 such that the opening 18 is larger than when the at least one flap 20 is in the closed position. In embodiments, in the second shape, the shape-memory wire 16 may be arcuate with one or more arcs, though other shapes are contemplated and possible.

Figure 2A:
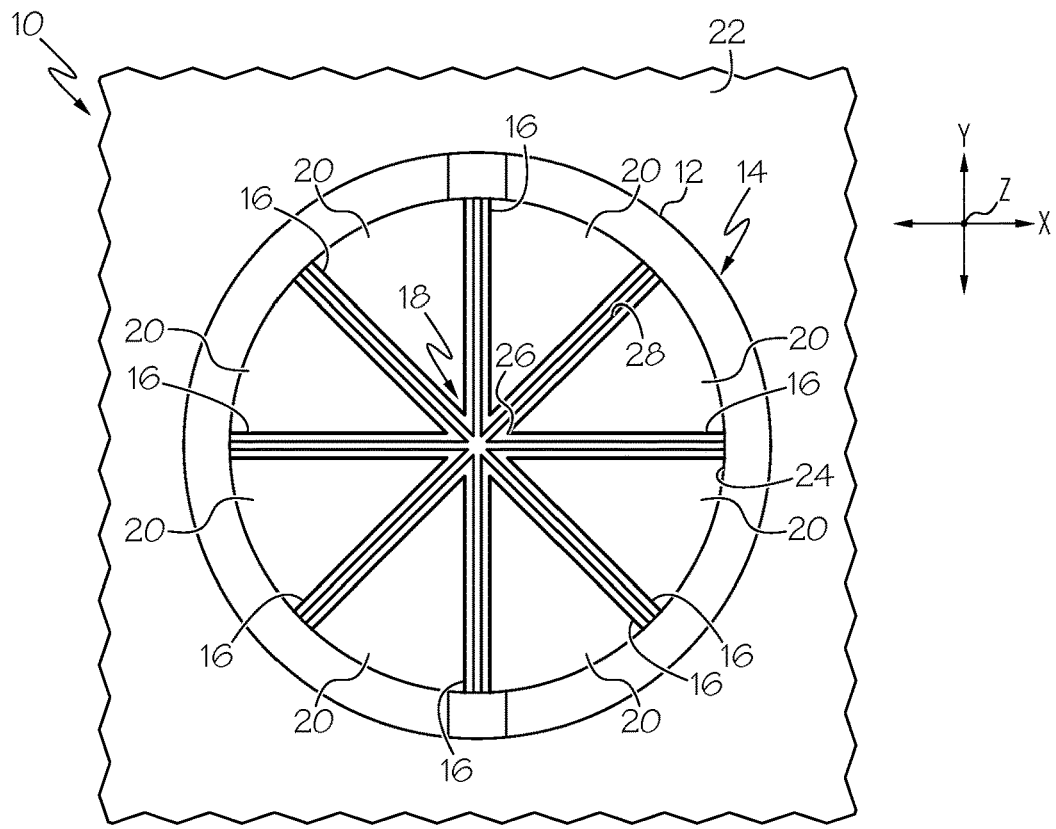
FIG. 2A schematically depicts a front view of a valve including a plurality of flaps in the closed position, according to one or more embodiments shown and described herein.
Figure 2B:
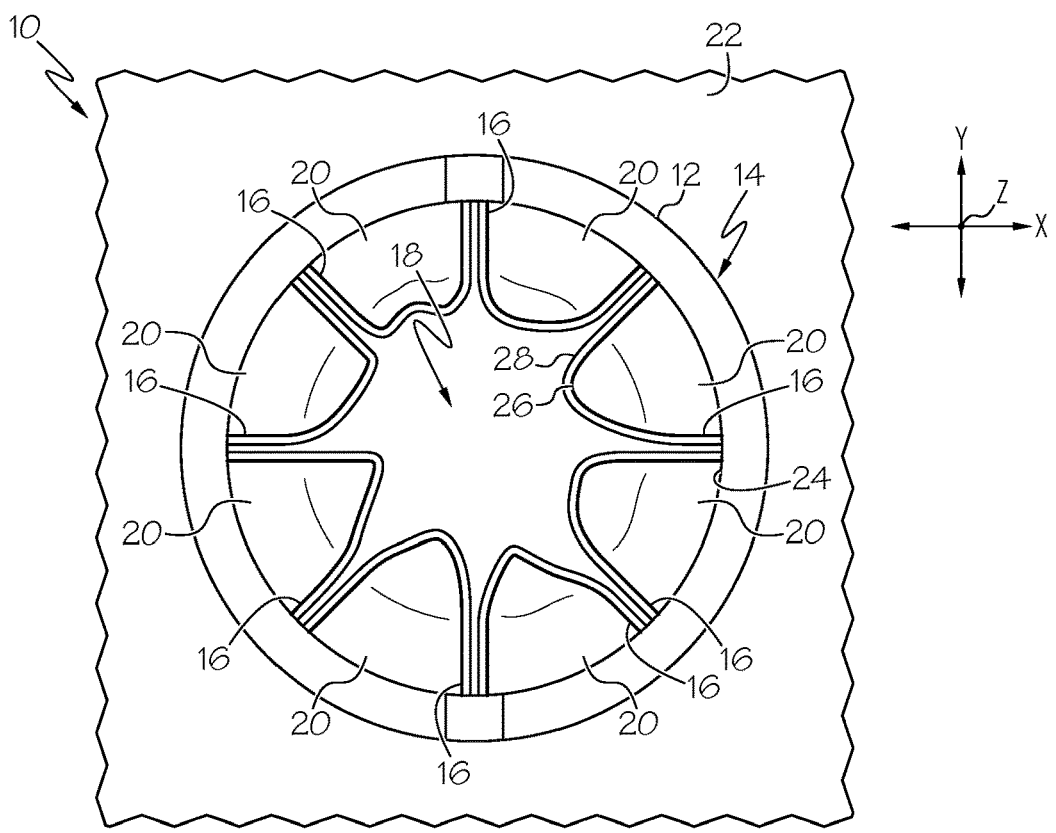
FIG. 2B schematically depicts a front view of the valve of FIG. 2A with the plurality of flaps moved to the open position, according to one or more embodiments shown and described herein.

Referring now to FIGS. 2A and 2B, front views of the valve 10 in the closed position (FIG. 2A) and the open position (FIG. 2B) are schematically depicted. In the depicted embodiment, the at least one flap 20 includes a plurality of flaps 20 (e.g., two or more flaps, three or more flaps, four or more flaps, etc.). In the depicted embodiment, the opening 18 over which the plurality of flaps 20 extend is circular. However, other shaped openings are contemplated and possible (e.g., oval, square, rectangular, etc.). In the indicated embodiment, each flap 20 is substantially triangular when in the closed position as depicted in FIG. 2A, though other shapes are contemplated and possible (e.g., square, rectangular, etc.). Accordingly, in embodiments, the plurality of flaps 20 fit together such that the plurality of flaps 20 collectively operate to open and/or close the valve 10. Each of the plurality of flaps 20 may include a shape-memory wire 16 and a conductive polymer 32 (see FIGS. 1A and 1B) as described above. The valve 10 may further include a current source 34 (see FIGS. 1A and 1B) as described above.

As noted above, the valve 10 may include a plurality of shape-memory wires 16, such that at least one shape-memory wire 16 is coupled to each flap 20, though additional shape-memory wires 16 may be included without departing from the scope of the present disclosure. In other embodiments, it is contemplated that a single shape-memory wire 16 may be coupled to two or more of the plurality of flaps 20. As described above, the shape-memory wire 16 may transition between a first shape and a second shape in response to stimulus. For example, in the first shape, the shape-memory wire 16 may extend radially to extend the flaps 20 across the opening 18 to the closed position, though other shapes are contemplated and possible (FIG. 2A). In the second shape, the shape-memory wire 16 may be bent, or curved, to pull the flaps 20 to the open position (FIG. 2B). In embodiments, the shape-memory wire 16 may extend along a terminal edge 28 of each flap 20.

The valve 10 may further include a frame 12 coupled to the substrate 14 (e.g., by sewing, adhesive, fasteners, or the like). The frame 12 may be coupled to the periphery portion 22 of the substrate 14 such that the frame 12 surrounds the opening 18 and may provide additional stiffness to the valve 10 to prevent valve collapse, depending on the application. For example, the frame 12 may be formed from plastic, metal, etc. However, it is noted that in certain cases, a frame 12 may be unnecessary or undesirable. While the frame 12 is depicted as a circle, the frame 12 may be any shape, such as triangular, rectangular, etc., which substantially corresponds to the shape of the opening 18. In embodiments, the substrate 14 may not include a periphery portion 22, such that the plurality of flaps 20 are coupled directly to the frame 12.

Figure 3:
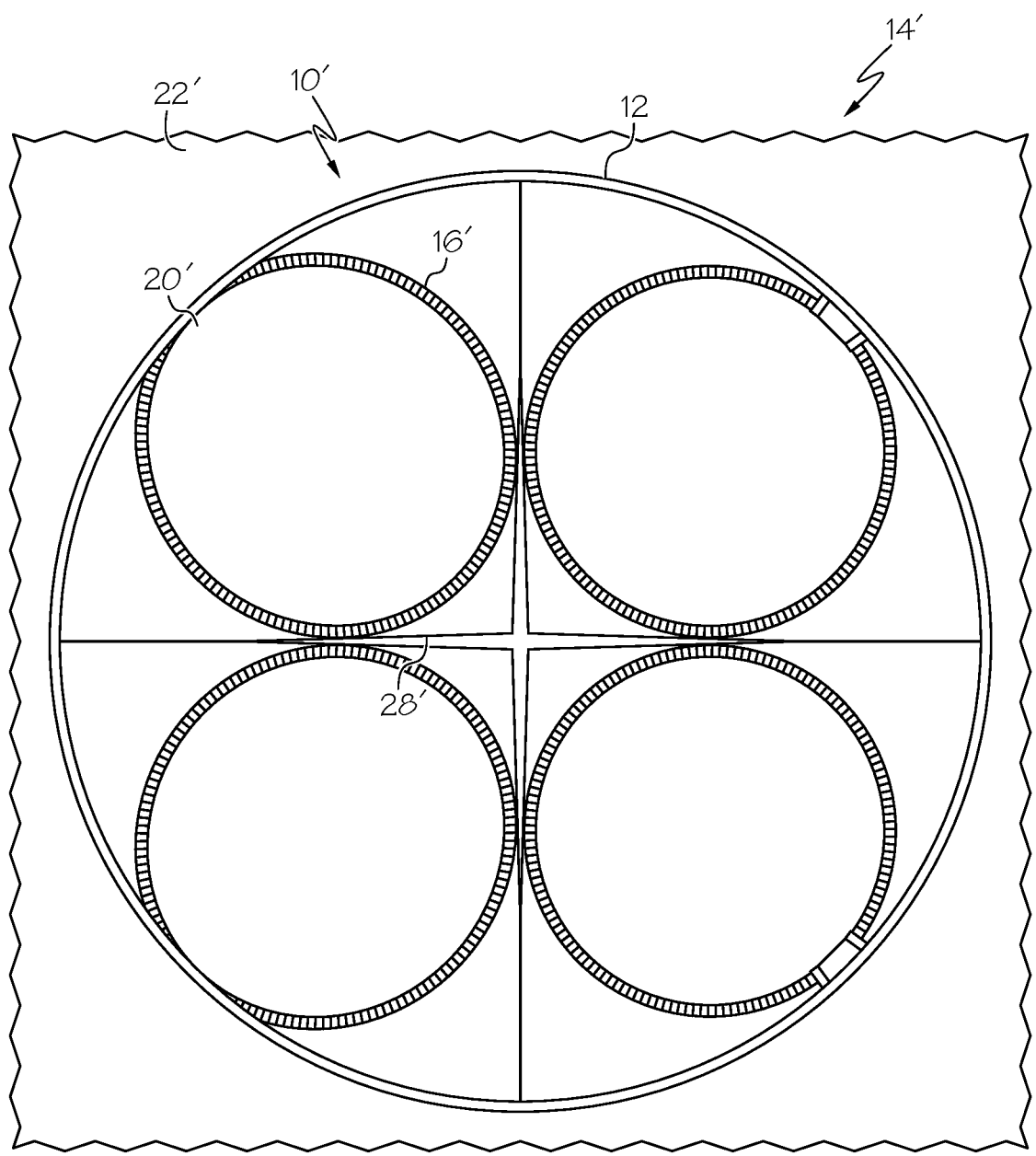
FIG. 3 schematically depicts a front view of an alternative embodiment of the valve of FIG. 2A, according to one or more embodiments shown and described herein.

Referring now to FIG. 3, a front view of an alternative embodiment of a valve 10' is depicted. FIG. 3 contains similar structure to the valve 10 of FIGS. 1A-2B. Accordingly, the above description is applicable to the present embodiment unless otherwise noted. Moreover, like numbers are used to refer to like features of the valve 10 depicted in FIGS. 1A-2B. In particular, in the present embodiment, the shape-memory wires 16' may be arranged in a substantially annular shape on each flap 20'. For example, the shape-memory wire 16' may extend from the periphery portion 22' of substrate 14' or the frame 12 to form an annular shape on each flap 20'. For example, a circumference of the shape-memory wire 16' may extend to contact a terminal edge 28' of each flap 20'.

Figure 4A:
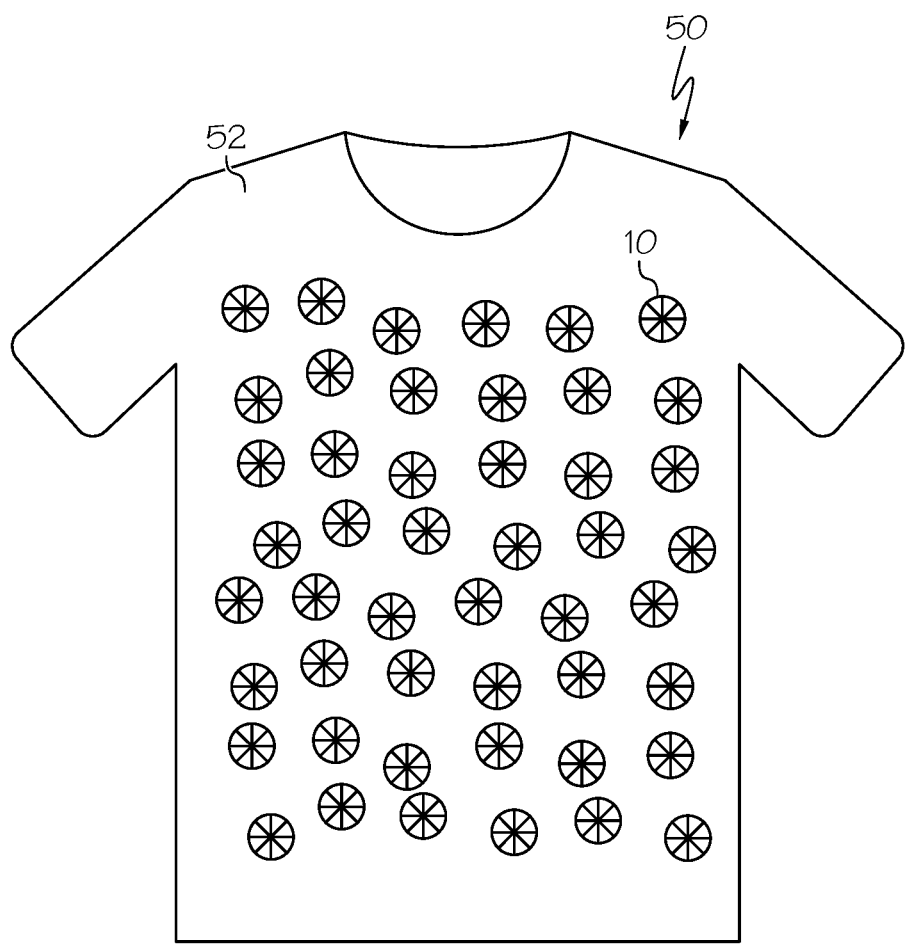
FIG. 4A schematically depicts a shirt including a plurality of valves in the closed position, according to one or more embodiments shown and described herein.
Figure 4B:
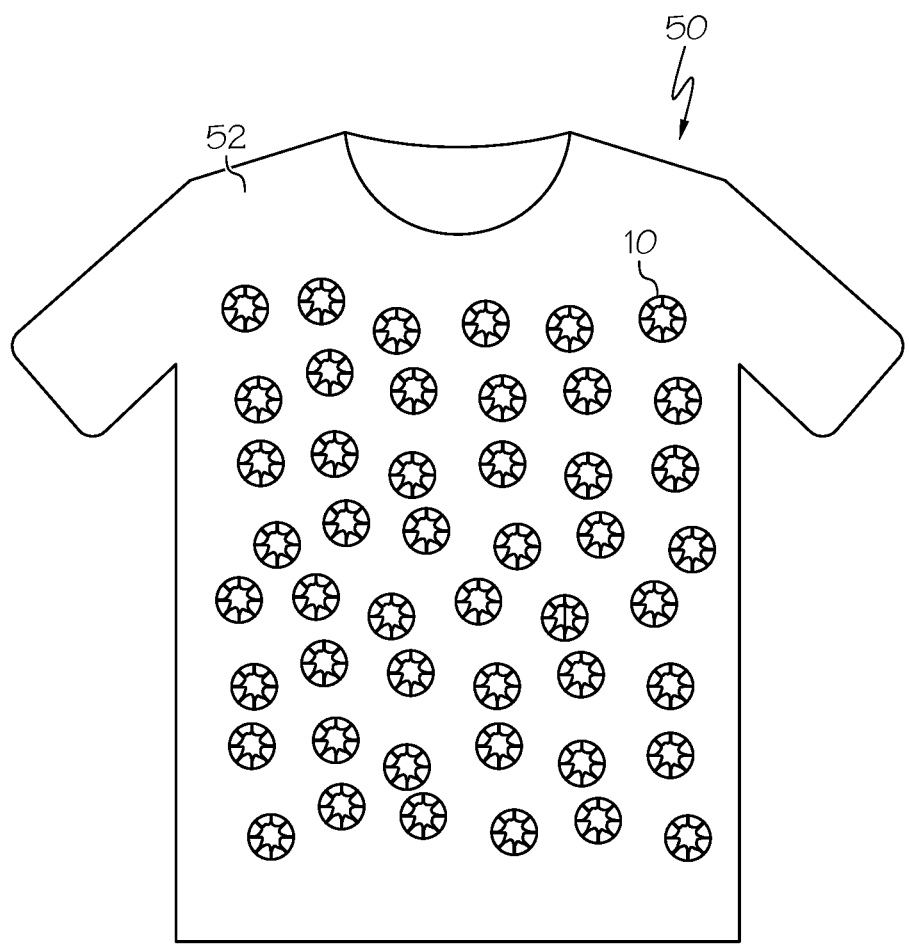
FIG. 4B schematically depicts the shirt of FIG. 4A with the plurality of valves in the open position, according to one or more embodiments shown and described herein.

Referring to FIGS. 4A and 4B, as noted above, the valve 10 may be incorporated into clothing, such as a shirt 50 to provide cooling airflow to a user. An exemplary shirt 50 including a valve 10 incorporated into the shirt 50 to provide cooling to a wearer is depicted. The valve 10 may be formed on the shirt front 52 as depicted, or may be formed anywhere (e.g., the back of the shirt 50, the sleeves, etc.). As depicted, the shirt 50 may include a plurality of valves 10 formed therein (e.g., two or more valves, four or more valves, eight or more valves, etc.) The valves 10 may be provided specifically in areas where cooling is desired, such as at locations which may experience perspiration (e.g., under the arms, at the back, etc.). In embodiments, the plurality of valves 10 may move to the open position in response to an ambient temperature and/or a body temperature of the user exceeding a threshold temperature (e.g., the transition temperature and/or the glass transition temperature described above). As depicted in FIG. 4B, the plurality of valves 10, or only a portion thereof may open in response to a temperature change. It is noted, in some embodiments, the valves 10 may respond or open at different temperature thresholds or they may all actuate at the same temperature threshold. In some embodiments, it is contemplated that the plurality of valves 10 are connected to a current source 34, such as described above, which may be used to selectively open and/or close the valves 10 as desired. It is noted that in embodiments, the shape memory wire 16 and/or the conductive polymer 32 may be coated or otherwise covered with an insulation layer. Though the plurality of valves 10 may be any size, it is contemplated that in clothing applications, the valves 10 may include a diameter of 5 cm or less, 4 cm or less, 3 cm or less, etc. In embodiments, the valve 10 may be provided on other articles of clothing, such as pants, jackets, shoes, hats, etc.

Figure 5:
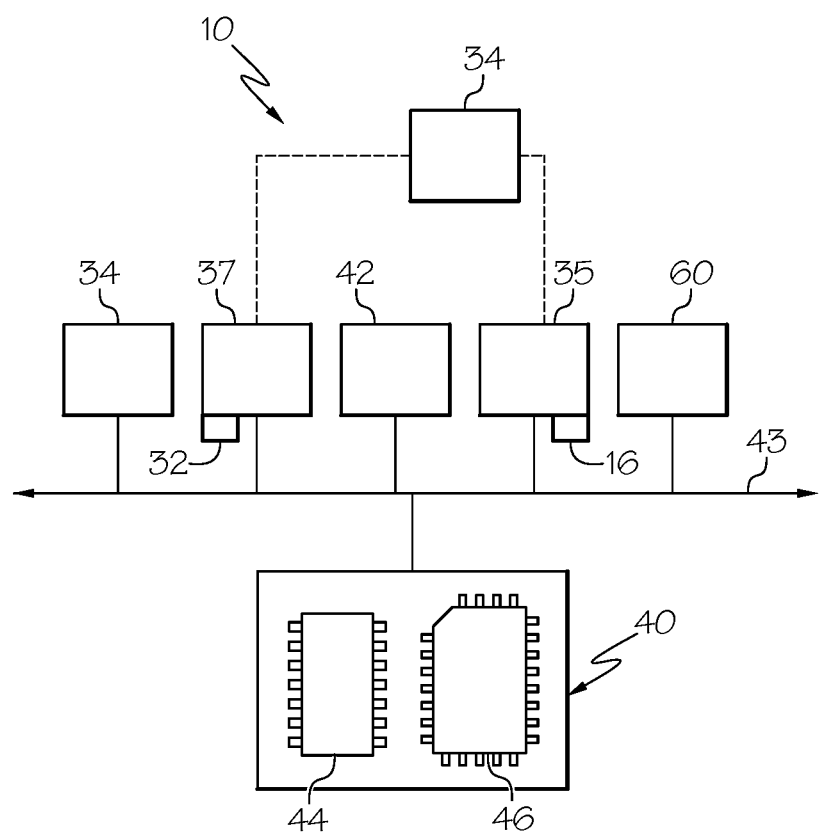
FIG. 5 schematically depicts communication between various modules of a valve, according to one or more embodiments shown and described herein.

Referring now to FIG. 5, the valve 10 is schematically depicted including an electronic controller 40 for controlling operation of the valve 10. As depicted the valve 10 may further include a communication path 43 that communicatively couples the electronic controller 40 to the current source 34, a temperature sensor 42, the first switch 35, the second switch 37, and/or one or more user input devices 60. It is noted that the valve 10 may have a greater or fewer number of components communicatively coupled to one another without departing from the scope of the present disclosure.

The communication path 43 provides data interconnectivity between various modules that form part of the valve 10. Specifically, each of the modules can operate as a node that may send and/or receive data. In some embodiments, the communication path 43 includes a conductive material that permits the transmission of electrical data signals to and between processors, memories, sensors, valves, pumps, etc. throughout the valve 10. In another embodiment, the communication path 43 may be a bus. In further embodiments, the communication path 43 may be wireless and/or an optical waveguide. Components that are communicatively coupled may include components capable of exchanging data signals with one another such as, for example, electrical signals via conductive medium, electromagnetic signals via air, optical signals via optical waveguides, and the like. Accordingly, the various components may be communicatively coupled via wired or wireless technology (e.g., Bluetooth, cellular, etc.).

The electronic controller 40 may be configured to selectively operate components of the valve 10. For example, the electronic controller 40 may control the current source 34 to selectively provide the current to the conductive polymer 32, the shape-memory wire 16, or both for selectively moving the at least one flap 20 between the open position and the closed position. For example, the electronic controller 40 may include one or more processors 46 and one or more memory modules 44 communicatively coupled to the one or more processors 46 over the communication path 43. The one or more processors 46 may include any device capable of executing machine-readable instructions stored on a non-transitory computer-readable medium. Accordingly, each processor 46 may include a controller, an integrated circuit, a microchip, a computer, and/or any other computing device. It is noted that the one or more processors 46 may reside within the valve 10 and/or external to the valve 10.

As noted above, the one or more memory modules 44 are communicatively coupled to the one or more processors 46 over the communication path 43. The one or more memory modules 44 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the valve 10 and/or external to the valve 10. The one or more memory modules 44 may be configured to store one or more pieces of logic to move the valve 10 between the open position and the closed position.

Embodiments of the present disclosure include logic stored on the one or more memory modules 44 that includes machine-readable instructions and/or an algorithm written in any programming language of any generation (e.g., 1GL, 2GL, 3GL, 4GL, and/or 5GL) such as machine language that may be directly executed by the one or more processors 46, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. As will be described in greater detail herein, logic stored on the one or more memory modules 44 allows the electronic controller 40 to, for example, detect a temperature of the conductive polymer 32, a user, the shape-memory wire 16, an ambient environment, or any combination thereof, and operate the valve 10 in response to the detected temperature.

The temperature sensor 42 may be communicatively coupled to the electronic controller 40 over the communication path 43. The temperature sensor 42 may be any temperature sensor operable to detect a temperature (e.g., thermocouples, RTDs (resistance temperature detectors), thermistors, semiconductor based integrated circuits (IC), or the like). In some embodiments, the temperature sensor 42 may include network interface hardware configured to communicate with weather databases or the like for determining temperature. Accordingly, the temperature sensor 42 outputs a temperature signal indicative of a temperature of an ambient environment, a user, the conductive polymer 32, and/or the shape-memory wire 16.

Still referring to FIG. 5, the valve 10 may include one or more user input devices 60 communicatively coupled to the electronic controller 40 over the communication path 43. The one or more user input devices 60 may include any device capable of transforming mechanical, optical, audible, or electrical signals into a data signal capable of being transmitted with the communication path 43. Specifically, a user input device 60 may include any number of movable objects that transform physical motion into a data signal that can be transmitted over the communication path 43 such as, for example, a joystick, a button, a keyboard, a switch, a knob, a microphone, a touch screen (e.g., such as of a mobile device or smart phone), or the like. For example, a user may input with the one or more input devices desired operation parameters (e.g., temperature ranges, max valve open position, valve closed position, etc.) for operating the valve 10.

The electronic controller 40 may be communicatively coupled to the first switch 35 and the second switch 37 that connect the at least one flap 20 (e.g., the shape-memory wire 16 and/or the conductive polymer 32) to the current source 34. The electronic controller 40 may receive outputs from the temperature sensor 42 and based on logic stored on the one or more memory modules 44 may selectively move the first switch 35 and the second switch 37 between the connected position and disconnected position in response to the detected temperature to open and close the valve 10. Specifically, the electronic controller 40 may move the first switch 35 and/or the second switch 37 between the connected and/or disconnected positions when the detected temperature exceeds a threshold temperature, which may, in some embodiments, be set by a user using the one or more user input devices 60 (for example, the threshold temperature be in the range of about 0° C. to about 50° C., such as between about 10° C. to about 40° C., such as about 20° C. to about 30° C., or the like).

For example, the logic stored on the one or more memory modules 44 allows the electronic controller 40 to detect a temperature of the conductive polymer 32, the shape-memory wire 16, an ambient environment, a user, or any combination thereof, by receiving a signal from the temperature sensor 42, and determining a temperature of the conductive polymer 32, the shape-memory wire 16, an ambient environment, a user, or any combination thereof based on the temperature signal from the temperature sensor 42. In response to detecting the temperature of the conductive polymer 32, the shape-memory wire 16, an ambient environment, a user, or any combination thereof, the electronic controller 40 may determine whether the detected temperature meets or exceeds the threshold temperature. In response to the detected temperature meeting or exceeding the threshold temperature, the electronic controller 40 may selectively energize the conductive polymer 32 and/or the shape-memory wire 16 (e.g., by opening and/or closing the switches 35, 37) to move the at least one flap 20 between the closed position to the open position. The electronic controller 40 may vary the current (e.g., by controlling the current source 34, which may be communicatively coupled to the electronic controller 40 over the communication path 43) to the conductive polymer 32 and/or the shape-memory wire 16 to selectively control the position of the flap 20 from the open position to the closed positions and/or positions between the open position and the closed position.

Figure 6:
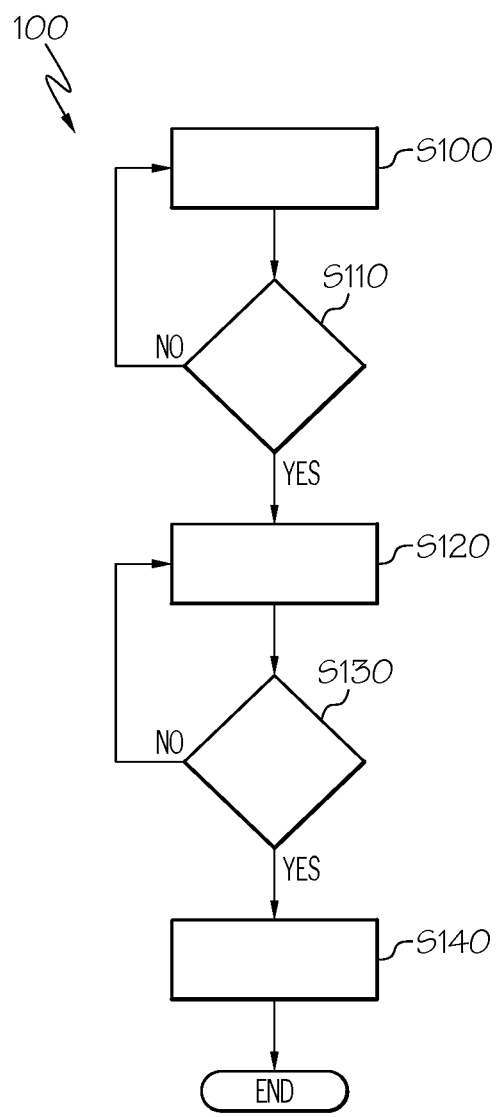
FIG. 6 depicts a flowchart illustrating a method for operating a valve, according to one or more embodiments shown and described herein.

Referring now to FIG. 6, a flow chart depicting a method 100 of controlling the valve 10 with the electronic controller 40 is described. It is noted that though a particular number of steps are depicted in a particular order, a greater or fewer number of steps may be included, in any order, without departing from the scope of the present disclosure. At step S100, the method 100 includes receiving, with the electronic controller 40, a temperature signal from the temperature sensor 42 indicative of a temperature of an ambient environment, the conductive polymer 32, a user, the shape-memory wire 16, etc. with the electronic controller 40. At step S110, the method 100 includes determining whether the temperature detected by the temperature sensor 42 meets or exceeds the threshold temperature. If the detected temperature meets or exceeds the threshold temperature, the electronic controller 40 may open the valve 10. If the detected temperature is below the threshold temperature, the method 100 returns to step S100 or the electronic controller 40 may close the valve 10. Accordingly, at step S120, when the temperature meets or exceeds the threshold, the method 100 includes opening the valve 10. For the example, opening the valve may include activating the current source 34 in response to the temperature signal from the temperature sensor 42. Specifically, the electronic controller 40 may activate the second switch 37 to provide current to the conductive polymer 32 to energize the conductive polymer 32. The current may increase the temperature of the conductive polymer 32 to or beyond the glass transition temperature, thereby transitioning the conductive polymer 32 from the rigid state to the flexible state. The electronic controller 40 may further activate the first switch 35 to provide current to the shape-memory wire 16 to energize the shape-memory wire 16. The current may increase the temperature of the shape-memory wire 16 to or beyond the transition temperature, thereby actuating the shape-memory wire 16 from the first shape to the second shape, retracting the at least one flap 20 from the opening 18, thereby transitioning the valve 10 from the closed position to the open position. The electronic controller 40 may vary the current to the shape-memory wire 16, varying the degree of bending of the shape-memory wire 16 to a shape between the first shape and second shape. Varying the degree of bending of the shape-memory wire 16 may move the valve 10 to the partially open position, varying the fluid flow through the opening 18.

The method 100 may further include terminating communication between the current source 34 and the conductive polymer 32 by moving the second switch 37 to the disconnected position, allowing the conductive polymer 32 to cool to a temperature below the glass transition temperature. When below the glass transition temperature, the conductive polymer 32 transitions from the flexible state to the rigid state, thereby holding the at least one flap 20 in the open position. Once the conductive polymer 32 transitions to the rigid state, the first switch 35 may be moved to the disconnected position. For example, the method 100 may further include receiving a signal from the temperature sensor 42 indicative of the temperature of the conductive polymer 32, and determining whether the detected temperature is below the glass transition temperature of the conductive polymer 32. Once the first switch 35 is moved to the disconnected position, the shape-memory wire 16 may be held in the second shape, thereby maintaining the open position of the valve 10 via the rigid condition of the conductive polymer 32.

At step S130, the method 100 may further include receiving a temperature signal indicative of a temperature of an ambient environment, the conductive polymer 32, a user, the shape-memory wire 16, etc. with the electronic controller 40. The method 100 may include determining whether the temperature detected by the temperature sensor 42 is below the threshold temperature. If the detected temperature is below the threshold temperature, the electronic controller 40 may, at step S140, activate the second switch 37 to provide current to the conductive polymer 32, thereby transitioning the conductive polymer 32 from a rigid state to a flexible state. As the shape-memory wire 16 was held in the second shape by the conductive polymer 32 in the rigid state, the transitioning of the conductive polymer 32 to the flexible state allows the shape-memory wire 16 to move to the first shape, thereby moving the valve 10 toward the closed position.

In embodiments where the conductive polymer 32 and shape-memory wire 16 include glass transition/transition temperatures on the range of 20° C. to 50° C., for example, the valve 10 may open in response to an ambient temperature, body temperature, or the like, without the use of the current source 34. For example, the valve 10 may initially be in the closed position. When the ambient temperature or body temperature of a user exceeds the transition temperatures, the conductive polymer 32 may transition from the rigid state to the flexible state and the shape-memory wire 16 may transition from the first shape to the second shape, thereby moving the valve 10 to the open position. When the ambient temperature is less than the transition temperatures, the temperatures of the conductive polymer 32 and shape-memory wire 16 may gradually decrease to the ambient temperature. For example, the shape-memory wire 16 may have a higher threshold transition temperature than the conductive polymer 32 such that the shape-memory wire 16 returns to the first shape prior to transition of the conductive polymer 32 to the rigid state to transition the valve 10 back to the closed position.

It should now be understood that the present disclosure is directed to a valve for regulating fluid (e.g., air or other gasses and/or liquid) flow across the valve. For example, valves according to the present disclosure may be included in a variety of systems and apparatuses, including, for example, HVAC (heating, ventilation, and air conditioning) systems (e.g., such as within vehicles, houses, businesses, or the like) and on clothing to regulate air flow across a body of a user. A valve according to the present disclosure may generally include a substrate, a shape-memory wire, and a conductive polymer. In some embodiments, the valve may further include a current source coupled to at least one of the shape-memory wire and/or the conductive polymer. The substrate may generally define an opening therethrough and include at least one flap selectively extendible across the opening. The shape-memory wire and the conductive polymer are each coupled to the at least one flap. In response to temperature changes and/or current from the current source, the conductive polymer and/or the shape-memory wire may change shape to retract or extend the at least one flap across the opening. That is, the conductive polymer and the shape-memory wire may be actuated to move the at least one flap between an open position, a closed position, and/or any position therebetween to regulate the flow of fluid through the opening. The substrate may be a conformable material such as fabric though other materials are contemplated and possible which may be lightweight and/or conformable to a mounting location, which may provide increased flexibility for using the valve in a variety of applications. Additionally, a softer valve may prove more ergonomic and comfortable for users. Valves of the present disclosure may also have reduced weight and be more compact than conventional valves, leading to improved design solutions.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A valve, comprising:
    a substrate defining an opening therethrough and comprising at least one flap selectively extendable across the opening;
    a shape-memory wire coupled to the at least one flap;
    a conductive polymer coupled to the at least one flap and transitionable between a flexible state and rigid state; and
    a current source coupled to the shape-memory wire and the conductive polymer, such that electrical current from the current source selectively energizes the shape-memory wire and the conductive polymer thereby transitioning the conductive polymer to the flexible state and moving the at least one flap between a closed position and an open position, wherein transitioning the conductive polymer to the flexible state allows the at least one flap to move between the closed position and the open position.

2. The valve of claim 1, wherein:
    the shape-memory wire transitions between a first shape and a second shape in response to being energized by the current source,
    in the first shape, the shape-memory wire extends the at least one flap across the opening into the closed position, and
    in the second shape, the shape-memory wire pulls the at least one flap away from the opening into the open position.

3. The valve of claim 1, wherein the substrate comprises a fabric interposed between the shape-memory wire and the conductive polymer.

4. The valve of claim 1, further comprising: a temperature sensor outputting a temperature signal indicative of a temperature of an ambient environment, the conductive polymer, or the shape-memory wire; and an electronic controller communicatively coupled to the temperature sensor and the current source, the electronic controller activates the current source in response to the temperature signal from the temperature sensor.

5. The valve of claim 4, wherein:
    the temperature signal is indicative of the temperature of the conductive polymer, and
    the electronic controller moves the valve from the closed position to the open position by:
        receiving the temperature signal from the temperature sensor;
        energizing at least one of the conductive polymer and the shape-memory wire in response to the temperature signal from the temperature sensor; and
        terminating electrical current from the current source to the at least one of the conductive polymer and the shape-memory wire to maintain a position of the at least one flap in the open position or the closed position.

6. The valve of claim 1, wherein the shape-memory wire extends along a terminal edge of the at least one flap.

7. The valve of claim 1, wherein the shape-memory wire is arranged in a substantially annular shape when the at least one flap is positioned in the closed position.

8. A valve, comprising:
    a substrate defining an opening therethrough and comprising at least one flap selectively extendable across the opening;
    a shape-memory wire coupled to the at least one flap; and
    a conductive polymer coupled to the at least one flap and transitionable between a rigid state and a flexible state, wherein
    the at least one flap moves between a closed position and an open position in response to a stimulus applied to the shape-memory wire and the conductive polymer being in the flexible state, wherein the conductive polymer being in the flexible state allows the at least one flap to move between the closed position and the open position.

9. The valve of claim 8, further comprising a current source electrically coupled to the shape-memory wire, the conductive polymer, or both, such that electrical current from the current source selectively energizes the shape-memory wire, the conductive polymer, or both to move the at least one flap between the open position and the closed position.

10. The valve of claim 9, further comprising:
    a temperature sensor that outputs a temperature signal indicative of a temperature of an ambient environment, the conductive polymer, or the shape-memory wire; and
    an electronic controller communicatively coupled to the temperature sensor and the current source, wherein the electronic controller activates the current source in response to the temperature signal of the temperature sensor.

11. The valve of claim 10, wherein:
    the temperature signal output by the temperature sensor is indicative of the temperature of the conductive polymer, and
    the electronic controller moves the valve from the closed position to the open position by:
        receiving the temperature signal from the temperature sensor;
        energizing at least one of the conductive polymer or the shape-memory wire in response to the temperature signal from the temperature sensor; and
        terminating electrical current from the current source to the at least one of the conductive polymer and the shape-memory wire to maintain a position of the at least one flap in the open position or the closed position.

12. The valve of claim 10, wherein:
    the temperature signal output by the temperature sensor is indicative of the temperature of the conductive polymer,
    the conductive polymer transitions from a rigid state to the flexible state in response to being energized by the current source, and
    the electronic controller moves the valve from the closed position to the open position by:

receiving the temperature signal from the temperature sensor;

energizing the conductive polymer with the current source to transition the conductive polymer from the rigid state to the flexible state;

thereafter, energizing the shape-memory wire with the current source to move the shape-memory wire from a first position to a second position;

terminating communication between the conductive polymer and the current source, thereby allowing the conductive polymer to return to the rigid state; and thereafter, terminating communication between the shape-memory wire and the current source, wherein the conductive polymer in the rigid state substantially maintains the shape-memory wire in the second position.

13. The valve of claim 8, wherein:

the conductive polymer comprises a glass transition temperature, and the conductive polymer transitions between the rigid state and the flexible state when a temperature of the conductive polymer meets or exceeds the glass transition temperature of the conductive polymer.

14. The valve of claim 13, wherein the glass transition temperature of the conductive polymer is between 20° C. and 70° C.

15. The valve of claim 8, wherein:

the shape-memory wire comprises a transition temperature, the shape-memory wire transitions between a first shape and a second shape when a temperature of the shape-memory wire meets or exceeds the transition temperature of the shape-memory wire, in the first shape the shape-memory wire extends the at least one flap across the opening into the closed position, and in the second shape the shape-memory wire pulls the at least one flap away from the opening into the open position.

16. The valve of claim 15, wherein the transition temperature of the shape-memory wire is between 10° C. and 80° C.

17. A method for operating a valve comprising a substrate, a conductive polymer, and a shape-memory wire, the method comprising:

transitioning the conductive polymer from a rigid state to a flexible state, wherein the substrate defines an opening therethrough and comprises at least one flap selectively extendable across the opening, and the conductive polymer and the shape-memory wire are coupled to at least one flap; and actuating the shape-memory wire between a first shape and a second shape while the conductive polymer is in the flexible state, thereby transitioning the valve between an open position and a closed position wherein transitioning the conductive polymer to the flexible state allows the at least one flap to move between the closed position and the open position.

18. The method of claim 17, further comprising receiving a temperature signal with an electronic controller of the valve, wherein the electronic controller controls transitioning of the conductive polymer and the shape-memory wire in response to the temperature signal.

19. The method of claim 17, further comprising receiving a temperature signal indicative of a temperature of the conductive polymer with an electronic controller of the valve, wherein the electronic controller controls transitioning the shape-memory wire in response to the temperature of the conductive polymer.

\* \* \* \* \*